United States Patent Office 2,943,955
Patented July 5, 1960

2,943,955

COMPOSITION AND PROCESS OF FORMING AN ADHERENT POLYOXIDE COATING ON A SURFACE

Harold C. Brill, Wilmington, Del., assignor to E. I. du Pont de Nemours and Company, Wilmington, Del., a corporation of Delaware No Drawing. Filed Feb. 21, 1955, Ser. No. 489,800

10 Claims. (Cl. 117—121)

This invention pertains to adhesives. More particularly, it pertains to adhesive compositions containing certain metal esters and to adhesion promoting films formed by hydrolysis of these ester compositions as well as to laminated structures embodying these adherent films.

It has been found that stable, insoluble, adherent polyoxide films may be produced by coating a surface with organic metal esters and then allowing these ester films to hydrolyze by contact with water vapor, such as moist air. These metal esters include the esters ranging in molecular weight from methyl to octyl titanates, zirconates, antimonites, aluminates, ferrates, etc. These hydrolyzed ester film coatings have been found useful as adhesion promoters in the formation of various laminates. However, the formation of the most useful films of this type requires quite careful control of such factors as concentration, quantity of ester per unit surface, and relative humidity of the ambient vapors. I have now found that the range of application may be extended and the adhesive property is markedly improved by the addition of modifying agents.

An object of this invention is therefore to improve the adhesiveness of the films formed by the hydrolysis of metal esters. Other objects are to permit the use of a wider range of ester solutions, and to render less critical the conditions of relative humidity in the preparation of these adhesion promoting films. While the present invention provides improved adhesion of the hydrolysis product film to the surface to which it is applied, a further object is to provide better post-hydrolysis adhesion to plastic adhesive substances subsequently applied to the hydrolysis product film in the formation of laminates.

These and other objects are attained by my invention which broadly comprises forming a non-aqueous fluid preparation of a hydrolyzable organic ester of an ester forming metal having a valence of at least three and not more than five, each organic radical of said ester having not more than eight carbon atoms, dispersing in said non-aqueous fluid ester preparation at least one hydrolysis modifying agent, coating a non-fluid surface with the resulting dispersion, exposing the coating to an atmosphere containing water vapor and to temperatures from room to 300° C. until any volatile solvents have substantially evaporated, and hydrolysis and polymerization of said ester of a metal have occurred thereby forming an adherent polyoxide coating on said non-fluid surface.

In a more specific embodiment I dissolve an alkyl metallate metal of groups III, IV and V, containing alkyl groups of not more than eight carbons, in a volatile non-aqueous solvent for said alkyl metallates, disperse a hydrolysis modifying agent in the resulting solution, spread the modified fluid composition on a solid surface in a thin film, allow substantial evaporation of said volatile solvent, expose the residual modifier containing film to an atmosphere containing water vapor and to temperatures ranging from room to 300° C., thereby causing hydrolysis and polymerization of the metallate to a condensed, adherent polyoxide film suitable as an adhesive base for application of another coating especially of a plastic material.

In a more detailed embodiment this invention comprises forming a non-aqueous fluid preparation of an alkyl metallate of an ester forming metal having a valence of at least three and not more than five, each alkyl radical containing not more than eight carbon atoms, dispersing in said fluid preparation at least one of the agents selected from the group consisting of (1) normally solid hydrocarbons, (2) normally solid chlorinated hydrocarbons, (3) alcohols of more than eight carbon atoms and their esters and mixed esters with said ester forming metals, (4) compounds of the structure RO-(-R'O-)$_x$-R'' wherein R and R' are hydrocarbons and R'' is hydrocarbon or hydrogen and $x$ represents integers from one to ten when R and R' are aliphatic and R'' is aliphatic or hydrogen and $x$ is zero or one when at least one of the R and R'' groups is aromatic, (5) organo- and water miscible, organic amino compounds having not more than 6 carbon atoms, and (6) polyhydroxy compounds having not less than two nor more than 8 carbon atoms and being used in amounts and concentrations compatible with said fluid preparation, coating a non-fluid body with said fluid preparation, exposing said coating to an atmosphere comprising water vapor and to temperatures ranging from room temperature to 300° C. until volatile substances present have evaporated and subsequent hydrolysis and polymerization of the residual alkyl metallate have occurred thereby forming an adherent, organo- and water-insoluble modified polyoxide film on the surface of said nonfluid body.

Still more specifically this invention comprises forming a non-aqueous fluid solution of a hydrolyzable alkyl metallate of a metal having a valence of at least three and not more than five, each alkyl radical containing not more than eight carbon atoms, dispersing in said fluid solution at least one of the agents selected from the groups consisting of (1) normally solid hydrocarbons, (2) normally solid chlorinated hydrocarbons, (3) alcohols of more than 8 carbon atoms and their esters with said ester forming metals, (4) compounds of the structure R-O-(-R'-O-)$_x$-R'' wherein R and R' are hydrocarbons and R'' is hydrocarbon or hydrogen and $x$ represents integers from one to ten when R and R' are aliphatic and R'' is aliphatic or hydrogen and $x$ is zero or one when at least one of the R and R'' groups is aromatic, (5) organo- and water-soluble tertiary amines, and (6) normally liquid polyhydroxy compounds containing not more than 8 and not less than 2 carbon atoms and used in amounts and concentrations compatible with fluidity in the metal ester solution, coating a non-fluid body with the resulting fluid preparation, exposing said coating to an atmosphere comprising water vapor and to temperatures ranging from room temperature to 300° C. until volatile substances have evaporated and subsequent hydrolysis and polymerization of the said alkyl metallate have occurred thereby forming and adherent, organo- and water-insoluble modified polyoxide film on the surface of said nonfluid body.

A more limited embodiment of this invention comprises dissolving an alkyl metallate in a compatible, anhydrous, organic, volatile solvent, dispersing at least one hydrolysis modifier in the resulting anhydrous metal ester solution, coating a surface with the resulting modified ester solution, after substantial removal of volatile solvents by evaporation causing hydrolysis and polymerization of the residual metal ester film by contacting with water vapor and curing at temperatures ranging from room temperature to 300° C, said alkyl metallates being of the type $(RO)_{xv-2y}M_xO_y'$ where R is an aliphatic organic group of not more than eight carbon atoms, M is a metal atom of valence $v$, O' is an oxygen attached to two of said metal atoms, $v$ is selected from the unit values 3, 4 and 5, $x$ may be any whole number less than 12, and $y$ may range from one less than $x$ to $n$ units more than $x$ provided $n$ is less than $x/2$, and said hydrolysis modifiers being selected from the group of agents consisting of hydrocarbons having melting points higher than 18° C., organo soluble chlorinated hydrocarbons melting above 18° C., alcohols of more than 8 carbon atoms and their ester compounds with the above designated metals, alkoxy polyethylene glycols, organo- and water-soluble organic tertiary amino compounds, and liquid polyhydroxy compounds of from 3 to 8 carbon atoms used in not more than 2% concentration based on the volatile solvent used.

Inasmuch as a wide variety of solvents, alkyl metallates and modifiers may be employed, this invention obviously has a great number of specific embodiments. Not only are the specific methods for preparing these improved adhesion promoting films numerous, but the subsequent uses of these films in the formation of laminated structures also encompasses the use of a large number of materials.

As previously disclosed, the alkyl metallates which may be used in this invention include the hydrolyzable organic esters of all metals having valences of 3, 4 and 5 and which contain organic groups of not more than 8 carbon atoms. It should be noted that silicon is not included in the list of elements forming these esters. Not only is it generally understood that silicon is not a true metal, but the organic esters of silicon do not behave in quite the same manner as the hydrolyzable metal esters. For example, the hydrolysis of silicon esters almost invariably requires the use of a strong acid catalyst which is not desirable in the application of adhesion promoting films especially to metals which may be corroded. The esters used are limited to those of the metals having valences from 3 to 5 inclusive because it is desirable that the resulting polyoxide film be substantially insoluble in water. The most commonly used and preferred esters are those of aluminum, titanium, zirconium, antimony and iron. Although it is known that the higher organic esters such as tetraoctyl titanate will form good polyoxide films, the lower alcohol esters such as the methyl, ethyl, propyl and isopropyl, are preferred since they appear to give more strongly bonded films.

The ortho esters or unimetallate of the metals are eminently suited for use in this invention. These esters are characterized by the formula $M(OR)_v$ where $v$ is the valence of the metal. The characteristic metal ester linkage which is the hydrolyzable function in forming the polyoxide film is

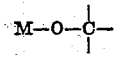

in which the alpha carbon is free of carbonyl oxygen. However, in its broadest embodiment, this invention requires at least two and preferably more than three such hydrolyzable linkages per molecule. Thus, for example, alkyl aryl metallates having one or two linkages of the type

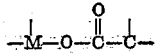

may be used. Metallates used in this invention include tetraethyl titanate, tetraisopropyl titanate, tetrabutyl titanate, octyl titanate, triisopropyl stearolyl titanate, the corresponding zirconates, the corresponding alkyl aluminates, ferrates and antimonites. The partially condensed esters or alkyl polymetallates may also be used. These are the result of reacting the unimetallated (orthoesters) with less than the stoichiometric amount of water. The condensed or polymetallates are exemplified by hexaisopropyl dititanate, tributyl triferrate, octaethyl trizirconate, etc., which are shown respectfully in the following formulas:

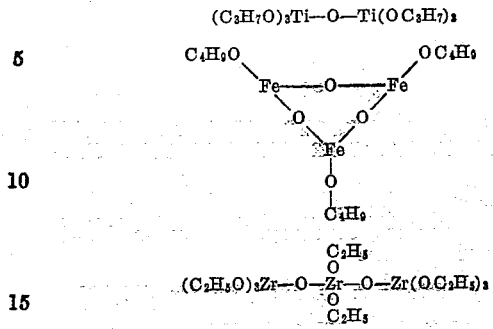

These condensed esters preferably do not have too high a degree of polymerization as indicated by the foregoing general formula in which $x$ is limited to 11. These polymetallates may also be modified by substituting a portion, preferably a minority, of the alkyl groups by acyl groups such as,

which may be butyryl, lauroyl, stearoyl, etc., the limitation of not more than 8 carbon atoms being herein applied only to the R of the alkoxy or true ester group.

While it is possible to prepare these films, and place them upon a surface to be coated without employing a solvent, it is generally more feasible to dissolve the ester in a suitable solvent. A choice of solvent is not especially critical in this invention, it being only necessary to avoid solvents which react with and precipitate or render the metallate non-hydrolyzable. The solvent is preferably characterized as volatile but some of the more high boiling solvents may be used inasmuch as it is within the scope of this invention to employ heat which will vaporize many solvents. Among the preferred solvents are included hexane, cyclohexane, octane, xylol, benzene, ethanol, isopropyl alcohol, petroleum ether, dioxane and mineral spirits. It is usually desirable to employ anhydrous solvents, however, the usual small amounts of moisture present in commercial solvents can be tolerated at the expense of partially hydrolyzing the alkyl metallate used. It is usually believed that these metallates will react quantitatively with less than stoichiometric amounts of water vapor becoming hydrolyzed and polymerized to a high degree through loss of alkyl radicals on the corresponding alcohols.

The hydrolysis modifiers used in this invention are selected primarily because of their effect on the rate of hydrolysis of the alkyl metallate film when exposed to moist air. Under conditions of high relative humidity and when it is desirable to use water miscible solvents or solvents of relatively low volatility in the preparation, the use of hydrolysis retarders greatly facilitates the preparation of an advantageously adhesive polyoxide film. The hydrolysis retarders include the higher molecular weight hydrocarbons and halogenated hydrocarbons, especially those which are normally solids, i.e., having melting points in excess of 18° C., the long chain alkyl metallates, mixed alkyl metallates, and mixed metallates of the ester forming metals and such alcohols in the free state, and compounds of the type $R(-OR'-)_xOR''$ as previously defined. Another group of modifiers include the water-soluble, organo soluble amino compounds preferably the tertiary amines. This group has been found to promote the rate of ester hydrolysis in the film and finds use under conditions of low relative humidity and also to balance any retarding action of other additives. The final group comprises polyhydroxy compounds which act as hydrolysis retarders and also to render the polyoxide film relatively hydrophilic.

According to this invention numerous modifying agents may be mingled with the alkyl metallate preparation. The modifier selected is dispersed in the fluid ester preparation. The degree of dispersion employed may vary considerably, that is, from true solution which is a molecular dispersion to colloidal dispersions or mere suspensions. At least one modifier is selected from several characteristic groups of substances which are chosen to control the hydrolysis rate and the polyoxide film characteristics. Several of these modifiers may be used together if desired. The first group of modifiers characterized as normally solid hydrocarbons, that is having melting points above 18° C., have been found to function as hydrolysis rate retarders in these new ester films as well as to influence the hydrophobic or oleophilic character of the resulting film. The presence of these rather large molecules seems to inhibit the hydrolysis rate under conditions of higher relative humidity until substantially all of the volatile solvent has evaporated thereby permitting the hydrolysis of a concentrated metallate film in situ which results in a more adherent polyoxide adhesion promoter. Then too, the presence of these hydrocarbons in the resulting hydrolyzed film appears to improve the wetting characteristics of the film with the respect to organic substances such as linseed oil paints, alkyd resins and other hydrocarbon compatible polymeric substances. Some of these hydrocarbons may be employed to control the hydrolysis characteristics and then be removed as by a baking procedure. Members of this class of modifiers which has been found particularly useful include naphthalene, camphor, paraffin waxes, microcrystalline hydrocarbon waxes, polyethylene, polystyrene, butadiene polymers and co-polymers, other hydrocarbon elastomers, and so forth. The halogenated hydrocarbons preferably solids at room temperature and soluble or at least dispersible in some suitable organic solvent serve in a capacity similar to the hydrocarbon class of modifier. They include chloronaphthylene, dichlorobenzene, chlorinated rubbers, polyvinyl chlorides, polyvinylidene chlorides, chlorinated polyethylene, chlorinated paraffin, etc. The third group of modifiers comprises alcohol and the metal esters of alcohols containing more than 8 carbon atoms per organic radical. Apparently, either the free alcohols or the metal esters of these alcohols function similarly. They tend to decrease the rate of hydrolysis in the metallate solution and it is believed that this is brought about through an ester interchange reaction between either the free alcohols or the added ester modifiers which converts the simple metallate into mixed metallates which contain an effective portion of organic groups containing more than 8 carbon atoms. This phenomenon is particularly noticeable when the long chain alcohols such as oleyl and stearyl alcohol or the metallates of these alcohols are used. Also, the employment of the high molecular weight alcohol compounds such as lauryl, myricyl or triphenylmethyl alcohol, and especially stearyl alcohol or tetra-stearyl titanate will produce improved oleophilic wetting properties in the resulting film. The alcohols used are preferably those soluble in organic solvents such as the lower alcohols and the volatile hydrocarbon liquids. They are preferably monohydroxy alcohols of from 9 to 31 carbon atoms inclusively and they may be saturated, unsaturated, or aromatic. The next group of reagents is structurally characterized as comprising certain ethers, polyethers and hydroxy ethers. This group includes the commercial products commonly known as Cellosolves and Carbitols, as well as monomeric and polymeric alkoxy ethylene glycols, polyethers, and aromatic monoethers such as phenyl ethyl ether and diphenyl oxide. These modifiers are also found to decrease the usual rate of hydrolysis of the ester solutions which is surprising in some instances inasmuch as some of these reagents are highly water soluble. This affords interesting possibilities, however, since one may choose a modifier from this group which will initially retard the hydrolysis rate and yet in the hydrolyzed film will act as a hydrophilic agent making the film more readily wet by water emulsion paints and ceramic enamels, photographic emulsions, for example. The fifth group of modifiers is characterized primarily by water and organo miscibility and the presence of amino groups. These agents act to increase the rate of hydrolysis and are therefore useful at relatively low humidities. An especially useful member of this group is hexamethylenetetramine. The final group embraces polyhydroxy compounds such as ethylene glycol, glycerine, pentaerythritol, octylene glycol, etc. Although these modifiers are hydrolysis retarders, they often result in a final film having hydrophilic properties thereby enhancing the spreading and adhering characteristics of water base coating such as water emulsion paints, water soluble adhesives, ceramic enamels and the like. It should be especially noted that the use of these agents is limited to the amounts and concentrations which are compatible with the fluidity of the coating composition used in this invention. By this is meant that substantial precipitations, solidification or gelling of the fluid preparation should be avoided. For example if glycerine is added to a titanium ester solution immediate precipitation results. However, if a 2% solution of glycerine is added to a solution of the ester a stable solution results which will produce the desired film on evaporation of the solvent.

Some of the specific applications of this invention are illustrated in the following examples.

*Example I*

A solution of one part of tetrastearyl titanate and three parts of tetraisopropyl titanate was prepared and found to be stable over a period of at least three months in a closed friction top paint can. This stock solution was diluted to 2% with a 50/50 blend of dry hexane and isopropyl alcohol. This solution was used to coat one-half of an aged alkyd enamel paint surface. It was applied by wiping with a rag soaked in the solution and allowed to stand for twenty four hours. This operation was carried out under conditions of approximately 40% relative humidity and 75° F. temperature. The resulting hydrolyzed and polymerized polyoxide film was very adherent and visible by virtue of interference colors. A fresh coat of alkyd enamel paint was applied to the whole surface and set aside for several days. The adhesion of the new paint on both halves of the surface was tested periodically by scratching with a screw-driver or a thumbnail. Invariably the paint could be removed from the untreated half while scraping with equal or somewhat more pressure failed to remove the new paint from the treated half. The additional adhesion provided by the polyoxide undercoat seemed to improve with age during several months' observation.

*Example II*

The adhesive promoting composition of Example I was used again. In this case, however, it was applied over one third of the surface of an aluminum panel; another third was left untreated and the remainder treated with a simple solution of tetraisopropyl titanate in 50/50 hexane/isopropanol of the same total titanium content. The application and curing of these coatings was carried out at 75° F. and 90% relative humidity. An alkyd enamel coat was applied to all three areas and dried. The subsequent adhesion tests showed superior adhesion in the instance of the priming coat modified with the tetrastearyl titanate. The simple isopropyl titanate solution apparently hydrolyzed too rapidly at this high relative humidity to produce an adherent film.

*Example III*

A stock solution comprising 9 parts by weight of tetrabutyl titanate and one part by weight of naphthalene was made. This solution was prepared by the aid of heat but when dissolving of the naphthalene was complete the solution was stable for long periods in closed containers. For use this stock solution was diluted with 40 parts of dry hexane and applied to clean steel test panels by dipping. The panels measuring 4 x 12 inches were immersed horizontally half way in the treating solution. The solvent was allowed to evaporate from the panel after dipping over a period of 30 minutes at 75° F. and 50% relative humidity. The panel was then placed in an oven provided with free air circulation at 125° C. for 15 min., cooled, coated by spraying with a white alkyd type baking enamel, dried and baked by the standard recommended procedure. After aging three months at normal room temperature, scratch tests showed markedly improved adhesion of the enamel on the treated surface.

*Example IV*

A solution was prepared having the following composition:

| | Pts. by wgt. |
|---|---|
| Xylol | 1470 |
| Tetraisopropyl titanate | 20 |
| Butadiene-styrene copolymer | 10 |

A clean steel plate was dipped in this solution, drained and hung in an atmosphere at 80% relative humidity until the solvent had substantially all evaporated. It was then heated at 250° F. for 30 minutes to further hydrolyze and polymerize the titanium ester. A slab of uncured Neoprene 3/8 inch thick was then hot pressed against this film using 40 p.s.i. pressure at 300° F. for 20 minutes. This heat and pressure caused the flow of the Neoprene layer into close contact with the polyoxide film and to absorb and fuse with the hydrocarbon hydrolysis modifier. As the curing of the Neoprene under heat and pressure progressed a strong bond was formed between it and the polyoxide films. The strength of the bond was estimated by the force necessary to peel off a measured width of the laminated Neoprene. A peel strength of 12 pounds per linear inch was obtained.

*Example V*

Two strips of aluminum were each coated at one end over an area 2 x 2 inches with a solution containing 2 parts of isopropyl titanate, 1 part of isopropyl aluminate, .4 part of naphthylene in 170 parts of a 50/50 mixture of isopropanol and hexane. After evaporation of the solvents and curing in air at 125° C. for 4 hours during which time the naphthalene was substantially all vaporized and removed, the two treated surfaces were soldered together using a regular commercial aluminum soldering flux and a standard 50/50 tin/lead solder. The resulting joint was twice as strong as a similar soldered joint made without the use of the modified polyoxide film. It appeared that the polyoxide film was strongly bonded to the metal and this film was wet better by the molten flux and solder than untreated aluminum hence the improved bond.

*Example VI*

4 parts by weight of tetraisopropyl titanate, 1 part by weight of oleyl alcohol and 200 parts by weight of normal hexane were mixed to form a solution. One-half of each of several aluminum panels was treated with this solution and the panel air dried over night at room temperature and 50%–70% relative humidity. These treated panels were coated with a white paint made in one case from a high molecular weight vinyl chloride-vinyl acetate copolymer dissolved in methylethylketone and in the other with a low molecular weight pigmented polymer in acetone. After two days the paint films were examined. Where the panel had been treated with the metal ester solution the vinyl paint was strongly bonded and in good condition. Where the precoat was not used the high molecular weight polymer film had lifted as a complete film from the aluminum. The low molecular weight film disintegrated into loose flakes.

*Example VII*

One-half of one side of a sheet of a vinyl plastic was coated with a film of a solution containing 9 parts by weight of tetraisopropyl titanate, one part of ethylene glycol monoethyl ether, and 500 parts of isopropanol. After standing 16 hours in normal room atmosphere the solvent had evaporated and the titanium ester had hydrolyzed and polymerized to a firm adherent film. A pigmented nitrocellulose ink was applied to both the treated and untreated surfaces and dried. The adhesion of the ink to these surfaces was tested by applying "Scotch" tape over the ink and then stripping it off. The tape pulled most of the ink from the untreated surface but the treated side remained intact.

*Example VIII*

Four volumes of a 2% by weight solution of tetraisopropyl titanate and one volume of a 2% solution of glycerol in isopropanol were mixed with good agitation. This solution was applied to aluminum metal by spraying and the coated metal allowed to stand over night in air at a relative humidity between 50 and 80%. The resulting polymerized ester film was insoluble in water or alcohol but hydrophilic in nature. A water base paint containing emulsified polyvinyl acetate was applied to the polyoxide priming coat. The paint had excellent spreading qualities on this hydrophilic surface. After normal setting of the paint film the polytitanate coating proved to be an excellent adhesive primer when compared with other methods of applying the same paint.

*Example IX*

8 parts of tetrabutyl zirconate, one part of hexamethylenetetramine, one part of tetraoleyl titanate were dissolved in 400 parts of butanol and this solution used to coat glass fiber. The fiber was passed through the solution, drained, and baked a few minutes at 125° F. This treatment was carried out at low relative humidity of about 30% at room temperature. These fibers were then incorporated in polyamide (nylon) rods by a casting method. These rods were found to have greater strength and durability as a result of the polyzirconate treatment of the fiber surfaces.

*Example X*

9 parts of tetrapropyl titanate, one part of naphthalene and 490 parts of xylol were mixed to form a solution. This solution was then used to treat the inner surface of an aluminum aircraft fuel tank. The excess solution was drained out and a slow current of air drawn through the tank for 16 hours (over night). This coated tank was then treated with a 2% solution of Thiokol rubber in xylol, dried, and heat cured. An excellent bond of a subsequent Thiokol coating to the tank was obtained and as a result the tank was protected against development of leaks due to vibration, etc. If naphthalene is not used or is baked out of the film prior to applying the Thiokol no adhesion of the latter is obtained.

*Example XI*

67 parts by weight of polyethylene was dissolved in 800 parts of xylol at 130° C. 133 parts of tetraisopropyl titanate was added and the resulting hot solution was cooled, during vigorous agitation, to room temperature. The cooled product comprises a dispersion of solid polyethylene in a solution of the propyl titanate in xylol; the metal ester apparently acting as a dispersing and stabilizing agent for the finely divided polyethylene phase. This solution containing 20% of active ingredients was stable in closed containers. Solutions of up to 30% active ingredients are less fluid but stable on storage.

For use the concentrated stock solution is usually diluted to less than 10% concentration and preferably to from .05 to 2%. The dilute solutions are stable for several days which is ample time for any contemplated use. Dilution with any compatible volatile solvent is employed, it being no longer necessary to use one such as xylol or octane which will dissolve the polyethylene. Hexane, benzene, ethanol, isopropanol, mineral spirits, toluene, etc. are satisfactory. The ratio of polyethylene to metal ester may vary widely. In practical application of such composition as adhesive priming coats the metal ester/polyethylene ratio has been found satisfactory over a range from 9–1 to 2–1.

*Example XII*

A 20% solution prepared in accordance with Example XI was diluted to 2% with isopropanol. Kraft paper was passed through this solution, over a set of draining rolls, and then over a roll heated to 240° F. The polyethylene acted as a hydrolysis retarder and good hydrolysis characteristics were obtained over relative humidities ranging from 20 to 85%. The resulting paper was hydrophobic, of high wet strength, and was antiblocking, i.e., the sheets did not stick together when stacked.

The treated paper was found very adherent toward polyethylene. For example, the treated paper may be hot coated with a solution of polyethylene in xylol and the resulting polyethylene film is so tightly bonded that removal tears the paper. Such paper may be heat sealed to itself, heat laminated with thicker sheets of polyethylene, etc. These products make a paper-polymer bond possible at much lower laminating temperatures (120° C.) and much stronger than similar laminates made without the modified hydrolyzed metal ester adhesion promotor. In addition the bonds are water stable and remain strong and flexible at very low temperatures.

*Example XIII*

Sheet aluminum was coated with a 2% dilution of the product described in Example XI. The solvent was evaporated and the film baked in normal air at 250° F. for 4 hours to accomplish hydrolysis and polymerization. This treated aluminum surface was then readily bonded to sheet polyethylene by heat and pressure. The bonds found were several times as strong as similar bonds made using modifier free polymerized isopropyl titanate films.

Multiple laminates of aluminum and polyethylene can readily be made by alternately stacking treated aluminum sheets and polyethylene sheets and applying heat and pressure preferably at or just under the polymer melting point. These laminates are particularly strong especially when the polyethylene sheets are at least 15 mils thick. This is due to failure in the polyethene rather than weakness in the formation of the polyoxide films. Water immersion tests of three months' duration showed no deterioration of these laminates.

*Example XIV*

Moisture proof cellophane, which had been coated with nitrocellulose was coated with a preparation of Example XI, diluted to 10% with isopropanol. After air drying over night to hydrolyze and polymerize the ester the treated cellophane and a sheet of polyethylene were fed through rolls at 240° F. The resulting laminate had greatly improved tear strength, and was far more impervious to water vapor than polyethylene alone making it especially useful for wrapping perishable materials.

*Example XV*

Corrugated paper was treated by dipping in a solution containing 4% of tetraisopropyl titanate and 1% of dispersed polyethylene in 50–50 xylol-isopropanol. Sheet aluminum was treated as in Example XIII. Both were allowed to stand over night at 70% relative humidity at room temperature. A sheet of polyethylene was then placed between the aluminum and the paper and hot pressed. A remarkably strong, waterproof bond was obtained. By laminating aluminum sheet to both sides of corrugated paper improved structural material can be made.

*Example XVI*

One-eighth of a pint of a stock preparation comprising 4 parts by weight of tetraisopropyl titanate to one part of tetraoleyl titanate was diluted with about 6 pints of odorless mineral spirits. This solution was used to treat the surface of old enameled woodwork in a home. Application by brush was satisfactory but rubbing on with a cloth wet with the solution had the added advantage of cleaning dirt and wax from the surface. The coated woodwork was exposed to good ventilation for 24 to 36 hours. A new coat of oil base enamel paint was applied. The application of the new paint was made easy because of the slight drag imparted by the mico-roughness and improved wetting of the hydrolyzed ester film. This effect eliminated the "skipping" usually encountered when trying to apply paint over old enamel. After hardening, the applied paint had much less tendency to chip and peel and was more durable than paint applied similarly but without the use of the modified hydrolyzed ester film or even without a titanium ester treatment which lacked the hydrolysis retarder.

*Example XVII*

Polyethylene terephthalate film of 1 mil thickness was fed from a roll into a coating machine over a preheat roll which heated the film to about 140° C. From the preheat roll the film was coated by being passed over a roll running partially submerged in a 2% hexane solution of isopropyl stearyl titanate containing stearyl and isopropyl groups in the ratio of 1 to 16.35 prepared by reacting 4 mols of octadecanol with 16.25 mols of tetraisopropyl titanate. The film was coated at approximately one gallon of solution per 2500 sq. ft. Solvent evaporation was completed by passing through an air seal into a 100° steam box providing for a one second retention in the curing atmosphere. The treated film was then laminated with sheet polyethylene between a hot roll and a cooled rubber pressure roll, the hot roll being against the terephthalate film. The polyethylene melted at 110° C., so that base film was heated at least to this temperature but not over about 150° C. during the lamination. The polyethylene adhered instantly to the treated surface and the material was rolled up and the roll further cured in a 120° oven for 20 minutes. The laminate would unroll since the untreated side of the terephthalate film did not adhere. By similarly coating both sides of the terephthalate film with the alkyl titanate, laminating on one side and heat curing out of contact with its own folded surfaces a self heat-sealing material is obtained which is well suited to overlap sealing.

*Example XVIII*

Sheets of polyethylene terephthalate film were coated on one side with a 2% solution in hexane of tetrabutyl titanate and naphthalene in a 4–1 weight ratio and cured in 80% RH air at about room temperature for at least one minute. These sheets were then coated on the treated side by blade application with a 3 mil wet film of a 10% solution of polyvinylbutyral in methanol and the methanol evaporated by placing in a 130° oven for 5 minutes. A clear, strong, heat-sealable, laminated film resulted.

When both sides were treated with the alkyl titanate overlap self sealing was easily obtained.

*Example XIX*

12 x 12 inch x 0.5 mil sheets of polyethylene terephthalate and similar sheets of 1 mil aluminum foil were treated on one side with a 2% solution in xylol of tetraisopropyl titanate and Neoprene in a 4–1 weight ratio and air cured to hydrolyze the metallate. The treated surfaces were coated with a rubber solution in xylol (rubber cement) and dried to a tacky condition. Laminates were prepared by pressing together the coated surfaces of the aluminum with the terephthalate. The product was a strong film suitable as a decorative or heat reflecting material.

Example XX

A sheet of ½ mil polyethylene terephthalate was treated with a 2% isopropanol solution of tetraiospropyl titanate, triisopropyl antimonite, and glycerine in a 4-2-1 weight ratio. The solvent was allowed to evaporate in air and the film heated 5 minutes in an oven at 100° C. at high humidity. This treated surface was cooled and coated with a 10% aqueous solution of a medium viscosity polyvinyl alcohol. When this film had dried somewhat, preferably to a tacky state yet as free of water as possible it was laminated by momentary pressure rolling to a sheet of wall paper and dried in warm air under tension to keep the laminate flat. The paper side could then be pasted and mounted on wall board giving a decorative, stain-resistant, washable surface. The presence of the antimony retarded discoloration of the white areas on exposure to sunlight.

Example XXI

A polyethylene terephthalate film was coated on both sides with the adhesion promoter and the polyvinyl alcohol adhesive as in Example XX. This film was then sandwiched under momentary pressure between two sheets of light weight wrapping paper. The resulting laminate was very strong, resistant to penetration by liquids and vapors.

Example XXII

Terneplate panels 4" x 16" were coated on one side with a 2% solution of isopropyl stearyl titanate in hexane and placed in an oven at 130° C. for 2 min. to evaporate solvent and polymerize the titanate. A ½ mil sheet of polyethylene of 100° C. melting point grade was squeezed onto the hot plate and the laminate further cured in the 130° oven for 20 minutes. A firm corrosion-resistant coating on the metal was obtained.

In adapting this process to continuous operation the roll of the metal may be coated in a coating machine with the titanate adhesion promoting solution, heated by passing over heaters or through an oven, and then the polyethylene extruded onto the treated metal surface and laminated over a chilled metal roll. A better bond is obtained if the metal polyethylene laminate is heated again just above the melting point of the polyethylene for a few minutes. This final heating may conveniently be done in the roll. The resulting coated metal is useful for making containers for corrosive fluids, such as water base paints.

Example XXIII

Two sheets of aluminum coated sheathing paper 2' x 2' were coated on the paper side with a 3% solution of tetraisopropyl titanate and polystyrene in a 4-1 weight ratio in xylene and exposed to 75% RH air for several minutes, and then cured at 130° C. for 5 minutes. These sheets were then placed in a flat steam platen mold 2' x 2' x ½" with the aluminated faces against the mold. A charge of expanding polystyrene pellets sufficient to fill about ⅛ of the mold space, and containing a blowing agent, was placed in the mold. The steam was turned on and the mold heated to 115–125° C. for about one minute and then cooled to room temperature. The cold mold was broken apart and the porous laminated product removed. The aluminum coated paper was firmly bonded to the foamed polystyrene making an excellent moisture barrier with superior thermal insulating properties.

Omission of the alkyl titanate adhesion promotion treatment resulted in a relatively poor bond to the foamed styrene. Foamed polystyrene and other foamed plastics can be laminated in a similar manner, using the titanate adhesion promoter, to glass, wood, metal, foil, polyethylene terephthalate, Lucite, etc.

Example XXIV

A 1 mil sheet of polyethylene terephthalate film was coated with a 2% solution of butyl titanate and rubber, in a 4–1 weight ratio in xylol, the solvent evaporated and the film cured at 130° C. for 5 minutes. Rubber cement was applied to this treated surface and to a 9" x 9" rubber floor tile. After the usual drying and evaporation of solvent to a tacky condition the cemented surfaces were pressed together to form a firm bond to provide an improved floor covering resistant to liquids penetration.

In addition to the specific, coated and laminated products mentioned in the examples, others can be mentioned. These involve polyethylene terephthalate-epoxy resin laminates which can be prepared by treating the former film with an adhesion promoter such as disclosed in Example XVII, curing, and then flow-coating with a thermoplastic epoxy resin. Similarly, two films can be treated with adhesion promoters followed by hot pressing the epoxy resin between them. A terephthalate coated epoxy resin laminate of novel and useful properties will result. Additional strength is obtained by using glass fiber-filled epoxy resins, especially those in which the glass fibers have been treated with adhesion promoters, e.g., as in Example IX.

The two-side treatment of sheet materials has special applications. For example, kraft paper may be coated on both sides with an alkyl titanate-polyethylene adhesion promoter and then cured. If desired, a film of polyethylene can be rolled or cast onto one side and the resulting laminate rolled onto a mandrel and baked at about 120° C. to cause massive adhesion. On removing the mandrel, a strong, waterproof tube is obtained. Obviously, other massive shapes can be similarly prepared from many materials by this multiple laminating procedure. Stacks of laminates may be bonded into solid blocks. When aluminum or other metal sheets or foils are laminated with dielectrics, such as polyethylene, polystyrene, polyethylene terephthalate, etc., electronic equipment, such as condensers, can be made.

While specific ratios, proportions and temperatures have been mentioned herein, these are subject to variance. Thus, temperatures ranging from about room to 300° C. can be utilized in curing this adhesion promotion film, and the ratio of hydrolysis-modifying compound to the hydrolyzable metallate can if desired range from 1 molecule of modifier per 20 atoms of metal to 2 molecules of modifier for each atom of metal.

The polyoxide films produced in this invention are characterized by a network of metal-oxygen-metal bonds. It is not essential, however, that the hydrolysis and polymerization of the initial ester preparation be completed to the point where a strict oxide film such as $(TiO_2)_x$ $(Fe_2O_3)_x$ etc. remains. It is believed that an appreciable residue of organic groups, even some of the hydrolyzable groups may frequently remain unhydrolyzed in a useful film product. Any organic acylate groups present on the metal atoms are not easily hydrolyzed and may remain in the film producing advantageous wetting or repellant properties. Furthermore, a considerable portion of the hydroxyl groups which are the first product of hydrolysis may be tolerated in a useful film. In some instances where hydrophilic character is desired, it is believed to be enhanced by these hydroxyl groups. Aging, especially at elevated temperatures tends to condense these hydroxyl groups with the elimination of water causing hydrophobic characteristics to increase in the film.

The improved polyoxide films prepared by this method are well suited as priming coats or adhesion promoting surfaces for the application of layers of other substances. Thus an improved method of producing laminated products is an embodiment of this invention. In carrying out this laminate formation the plastic substance applied to the modified polyoxide film is preferably initially fluid but subsequently hardenable to form a non-fluid laminated structure. Selection of a particular hydrolysis modifier according to this invention may be made so that the modifier itself may aid the initial fluidization of the applied plastic material. These plastic substances may be the so-called drying oils such as linseeed oil paints, varnishes, alkyd resins, and related paint compositions, or they may be thermoplastic materials such as polyethylene which may be laid on in non-fluid form as a sheet and then adhered by at least partial melting followed by cooling. Other suitable plastic materials are those which may be applied in monomeric form such as the acrylates and methacrylates which may then be set to the non-fluid condition by radiation polymerization. Fluid substances which are polymerized to the non-fluid state by chemical catalysts may be also used. The fluid condition necessary for the application of these plastic materials may also be obtained by application of pressure or by way of solution in any suitable solvent, thus, lacquers and soluitons of such polymeric materials as the polyesters and polyamides may be applied to the adhesion promoting film of this invention.

As previously pointed out the use of the simple unmodified ester solutions in forming adhesion promoting films require considerable care with respect to the control of conditions. By means of this invention, however, it is possible to formulate compositions which may be applied with marked success under a wide range of humidity and temperature conditions. To do this, it is within the scope of this invention to prepare formulations which include simultaneously the hydrolysis promoting agents and the hydrolysis suppressing agents. It is important in this invention that these hydrolysis control agents be dispersed in the film forming composition prior to the hydrolysis polymerization of the applied film of the metal ester. In addition to the dispersion of hydrolysis modifying agents in this composition one may also disperse considerable portions of a plastic material, which, preferably, has a high adhesive affinity for the plastic coating subsequently to be placed upon the adhesion promoting film. This appears to enhance still further the strong bond between the overlying film and the adhesive intermediate film. For example in bonding polymethyl methacrylate to glass, a portion of the methylmethacrylate monomer is dispersed in the adhesive composition so that, after the hydrolysis and polymerization of the intermediate film, the application of heat to the ultimate glass-to-lucite laminate will create a bond of greater strength due to the polymerization hardening of the methacrylate monomer in contact with the overlaid sheet. The monomer thus serves as the initially fluid portion of the plastic material to be bonded in the laminate.

Certain substances which may be used as the base material supporting the hydrolyzed ester film may contain substances which react with the metal ester such as cellulose, free acids, ester, etc. This does not appear to be disadvantageous since it is possible to increase the quantity of the ester used to supply the needs of this surface reaction in addition to forming the hydrolyzed polyoxide film. The successful preparation of adherent polyoxide films heretofore, hinged on rather severely limiting the amount of ester hydrolyzed on a unit area. This made the treatment of reactive surfaces such as those of cellophane very diffcult. However, by employment of my novel modifiers or control agents it is possible to apply an excess of the ester and still obtain excellent adhesion.

In adapting polyethylene to use in this invention as a member of the group hydrocarbon modifiers, considerable difficulty was encountered in preparing a suitable fluid dispersion in the ester solution. Efforts to disperse finely divided solid polyethylene by agitation resulted in a gummy mass. Solvents for this polymer are rare and the only effective solvents found were the aromatic hydrocarbons, toluene, xylenes and n-octane. Even these required use of temperatures in excess of 60° C. to develop sufficient solubility. By dissolving polyethylene in boiling xylol and then mixing this solution while hot with one of the metal esters and agitating during cooling a stable dispersion of the polyethylene was obtained. The metal ester appears to act as a stabilizing agent for the dispersion, since a similar procedure not employing the ester resulted in a gummy mass of the polymer. This composition containing xylol, and, if desired, other solvents such as hexane, isopropanol, etc. used to carry the ester, dispersed polyethylene and a metal ester is an extremely versatile adhesion promoter, and is believed to be a novel composition of matter.

The following theoretical discussion, while admittedly incomplete and perhaps inaccurate, may serve to explain some of the basic features of this invention. As already stated it is known that the metal esters, when hydrolyzed on a solid surface have remarkable adhesive properties, i.e. the resulting polyoxide films formed in this manner adhere strongly to a wide variety of surfaces. When these ester films in pure form are hydrolyzed, the conditions of temperature and humidity, as well as the amount of ester used per unit area must be carefully regulated. Failure to obtain a strongly adherent film or one which is well suited to the subsequent bonding of a superimposed layer may result from too rapid hydrolysis.

This can occur under normal relative humidity ranges. It is thought that when hydrolysis proceeds to a considerable extent prior to the evaporation of most of the solvent present, a suspension of polyoxide results. On the other hand, when a concentrated ester film is hydrolyzed at reasonable rates a dense, adherent and coherent film is formed. The modifiers, particularly the hydrolysis re tarders, of this invention serve to postpone the hydrolysis under practical conditions until effective solvent removal is obtained. This function of the modifiers used is important, however, one frequently desires to promote the hydrolysis rate after the solvent has evaporated and a promotor such as hexamethylenetetramine accomplishes this. The manner in which the tertiary amines operate is not clear, it may catalyze hydrolysis by first forming a complex or addition compound with the metal ester. A retarder is employed at normal and high humidities and is especially needed when the less volatile solvents are used. This seems to be because the water vapor diffuses to the ester when evaporation is slow especially at high humidities. The promoter seems to become more effective in the solvent free film hence it is reasonable to sometimes employ both a retarder and a promoter in one preparation.

Hydrolysis, which replaces the alkoxy groups of the metal ester with hydroxy groups, is the first stage in the formation of the polyoxide film. The hydrolysis is accompanied or succeeded by a condensation polymerization which may be indicated in its simple elements by the two equations:

$$>M\!-\!OH + HO\!-\!M< \leftrightarrow >M\!-\!O\!-\!M< + H_2O$$

or $$>M\!-\!OR + HOM< \leftrightarrow >M\!-\!O\!-\!M< + ROH$$

Both of these reactions may be occurring simultaneously and the result is a polyoxide network polymer of considerable strength. It has been noted that the esters of the lower molecular weight alcohols form more strongly bonded polyoxide films. This is thought due simply to the fact that, in view of the relatively small volume occupied by the small groups, a higher concentration of metal-oxygen and metal-hydroxyl group bonds results. This means more points of attachment to the supporting surface and a stronger internal structure in the network.

It has also been shown that the modifiers used can be selected to change and moderate the nature of the polyoxide film surface with respect to its wetability by other substances. Thus the film may be made hydrophilic, or hydrophobic or altered to be especially adherent to certain overlaid plastics used in the preparation of laminates. Polyethylene is an example. It first controls the hydrolysis rate to produce a strong film and then provides a film surface which is readily wet and adherent toward not only more polyethylene but toward many other compatible adhesives. The films of this invention usually serve to improve the action of a known adhesive and hence have been called adhesion promoters. More specifically, the modified films render the surface to which they are applied particularly receptive to certain adhesives resulting in an overall bonded system of greater strength and durability.

Several of the many practical uses of this invention have been described in detail. Obviously, there are many more specific applications such as in coating wire with polyethylene and other insulating plastics, coating of many metals for prevention of corrosion, the formation of numerous laminates, and in waterproofing and strengthening textiles and paper.

The primary advantages of this invention pertain to the control of hydrolysis of the metal ester film and to the control of the wetting properties of the polyoxide film. Other very novel advantages arise from the application of this invention. For example, polyethylene is well known for its inert waxy non-adhesive surface. However, by properly utilizing the modified films herein disclosed, a layer of polyethylene becomes an excellent adhesive. The cellophane to polyethylene laminates represent marked improvements in the field of wrapping. These products are not only transparent, of high tear strength, water proof and water vapor proof, but are durable and flexible and retain these properties at very low temperatures making them of outstanding value in wrapping frozen foods.

This application is a continuation in part of my co-pending application, Serial No. 378,175, filed September 2, 1953, now abandoned.

I claim:
1. An adhesion-promoting composition consisting essentially of an alkyl titanate having up to 8 carbon atoms per alkyl group, a volatile inert organic solvent for said alkyl titanate, and at least one hydrolysis modifier for said alkyl titanate selected from the group consisting of normally solid hydrocarbons; normally solid, chlorinated hydrocarbons; monohydroxy alcohols having 9–31 carbon atoms and the titanates of said monohydroxy alcohols; compounds of the structure

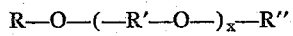

R—O—(—R'—O—)$_x$—R'' wherein R and R' are hydrocarbons and R'' is hydrocarbon or hydrogen and $x$ represents integers from 1 to 10 when R and R' are aliphatic and R'' is aliphatic or hydrogen and $x$ is zero or one when at least one of the R and R'' groups is aromatic; and tertiary amines which are both water soluble and organo soluble, the combined concentration of the alkyl titanate and the hydrolysis modifier being up to about 2% by weight of the adhesion-promoting composition and the hydrolysis modifier being present in a minor amount by weight with respect to the alkyl titanate.

2. The process of claim 1 in which the alkyl titanate is tetraisopropyl titanate.
3. The process of claim 1 in which the alkyl titanate is butyl titanate.
4. The process of claim 1 in which the alkyl titanate is tetraisopropyl titanate and the hydrolysis modifier is stearyl titanate.
5. The process of claim 1 in which the alkyl titanate is tetraisopropyl titanate and the hydrolysis modifier is polyethylene.
6. A process for preparing the surface of a solid for the subsequent application of an adhesive material comprising applying a thin film of the composition of claim 1 to said surface, exposing the resulting film to an atmosphere containing water vapor at temperatures ranging from room to 300° C. until volatile solvents present become substantially evaporated and hydrolysis and polymerization of said titanate takes place to form an adherent polyoxide coating on said surface.
7. The process of claim 6 in which the alkyl titanate is tetraisopropyl titanate.
8. The process of claim 6 in which the alkyl titanate is butyl titanate.
9. The process of claim 6 in which the alkyl titanate is tetraisopropyl titanate and the hydrolysis modifier is stearyl titanate.
10. The process of claim 6 in which the alkyl titanate is tetraisopropyl titanate and the hydrolysis modifier is polyethylene.

References Cited in the file of this patent

UNITED STATES PATENTS

| | | |
|---|---|---|
| 2,614,112 | Boyd | Oct. 14, 1952 |
| 2,643,262 | Bostwick | June 23, 1953 |
| 2,643,984 | Boyd | June 30, 1953 |
| 2,676,102 | Boyd et al. | Apr. 20, 1954 |
| 2,710,267 | Boyd et al. | June 7, 1955 |
| 2,710,268 | Bump | June 7, 1955 |

FOREIGN PATENTS

| | | |
|---|---|---|
| 125,450 | Australia | June 1, 1945 |
| 611,990 | Great Britain | Nov. 5, 1948 |
| 652,136 | Great Britain | Apr. 18, 1951 |
| 654,049 | Great Britain | June 6, 1951 |

OTHER REFERENCES

"Esters of Titanium," by Kraitzer et al., Journal of Oil and Colour Chemists' Association, vol. 31, No. 340, 1948.

"New Compounds of Titanium," Gardner et al.; Am. Paint and Varnish Mfgs. Assoc.; Circ. No. 366, pages 327–337; July 1930; C.A. 25; 2971; pages 329, 330 and 337 particularly relied upon.

"Preparation and Properties of Esters of Polyorthotitanic Acid," Boyd; Journal of Polymer Science; April 27, 1951; vol. VII, No. 6; pages 591–602; page 592 particularly.

Dupont Titanium Organics, Titanium Esters.